United States Patent
Stieb

(10) Patent No.: US 8,430,115 B2
(45) Date of Patent: Apr. 30, 2013

(54) LEAK DETECTION SYSTEM FOR HUMIDIFIER

(76) Inventor: Norman Thomas Stieb, Mesquite, NV (US)

( * ) Notice: Subject to any disclaimer, the term of this patent is extended or adjusted under 35 U.S.C. 154(b) by 540 days.

(21) Appl. No.: 12/753,206

(22) Filed: Apr. 2, 2010

(65) Prior Publication Data

US 2011/0162727 A1 Jul. 7, 2011

Related U.S. Application Data

(60) Provisional application No. 61/292,326, filed on Jan. 5, 2010.

(51) Int. Cl.
*F16K 23/00* (2006.01)
(52) U.S. Cl.
USPC ........ 137/312; 137/391; 137/456; 137/487.5; 137/558
(58) Field of Classification Search .................. 137/312, 137/391, 456, 487.5, 558; 126/113
See application file for complete search history.

(56) References Cited

U.S. PATENT DOCUMENTS

| | | | | | |
|---|---|---|---|---|---|
| 3,119,887 | A | * | 1/1964 | Baehr | 261/36.1 |
| 3,770,002 | A | * | 11/1973 | Brown | 137/312 |
| 5,918,617 | A | * | 7/1999 | Garth | 137/1 |
| 6,950,032 | B1 | * | 9/2005 | Hewitt et al. | 340/686.1 |
| 2007/0257386 | A1 | * | 11/2007 | Menassa | 261/130 |
| 2008/0179962 | A1 | * | 7/2008 | Wood | 307/98 |
| 2010/0045471 | A1 | * | 2/2010 | Meyers | 340/605 |

* cited by examiner

*Primary Examiner* — Craig Schneider
*Assistant Examiner* — Jessica Cahill
(74) *Attorney, Agent, or Firm* — Sinorica, LLC

(57) ABSTRACT

An electronic leak detection system for home humidifier using the duct air conditioning system. The leak detection system uses a simple sensor in a water collection tray under the humidifier to detect if leakage has occurred. An auxiliary solenoid valve is connected in line with the water supply to the humidifier. When leakage is detected, power to the humidifier system is shut down and an auxiliary solenoid valve is powered.

13 Claims, 6 Drawing Sheets

LEAK DETECTION SYSTEM FOR HUMIDIFIER

The current application claims a priority to the U.S. Provisional Patent application Ser. No. 61/292,326 filed on Jan. 5, 2010.

FIELD OF THE INVENTION

The invention relates generally to a leak detection and device shut-off system. The system is installed to detect leaks primarily from humidifiers and to shut off the humidifier system to prevent water damage.

SUMMARY OF THE INVENTION

As the earth rotates around the sun, the distance between the earth and sun constantly change. As a result this the environmental conditions of the earth changes as well. These environmental changes include the rise and fall of temperature, which affect the humidity of the air. To compensate for these changes and provide a more comfortable environment for homes, humidifiers were developed. Humidifiers provide additional moisture to the air allowing for a more comfortable breathing environment. But problems may sometimes occur to the humidifiers which causes leakage of water. This leakage of water can often cause damages to homes. The presented invention overcomes such problems by preventing further leakage when detected. The present invention is a leak detection system for humidifiers installed in the attics of buildings that contain air-handling units. The device will turn off the water supply or electrical power for the humidifier if a leak should occur, thus preventing damage to the ceiling and walls below the air-handling unit.

DETAIL DESCRIPTIONS OF THE INVENTION

All illustrations of the drawings are for the purpose of describing selected versions of the present invention and are not intended to limit the scope of the present invention.

Figure 1:
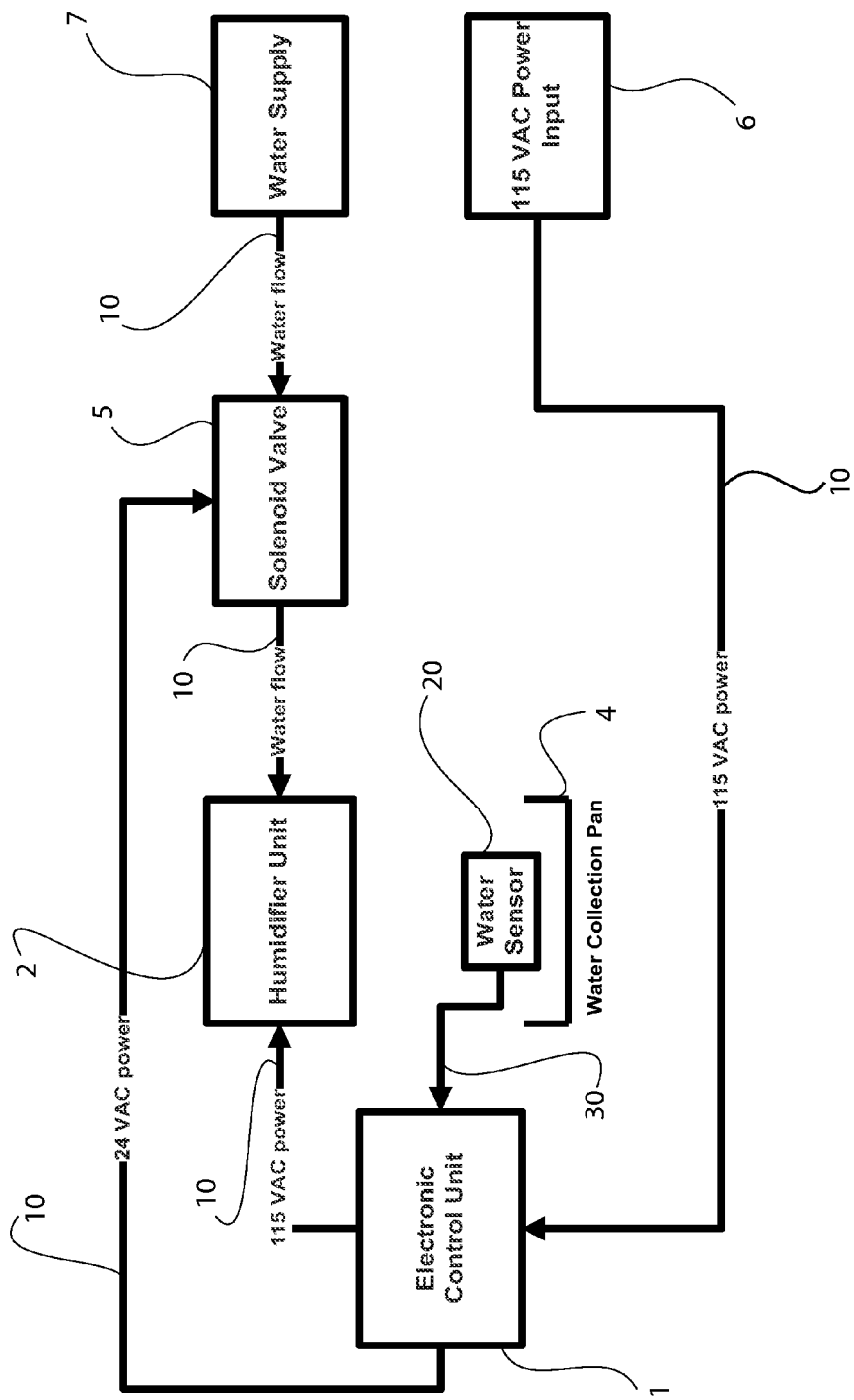
FIG. 1 is a connectivity diagram of a leak detection system for a humidifier.
Figure 3:
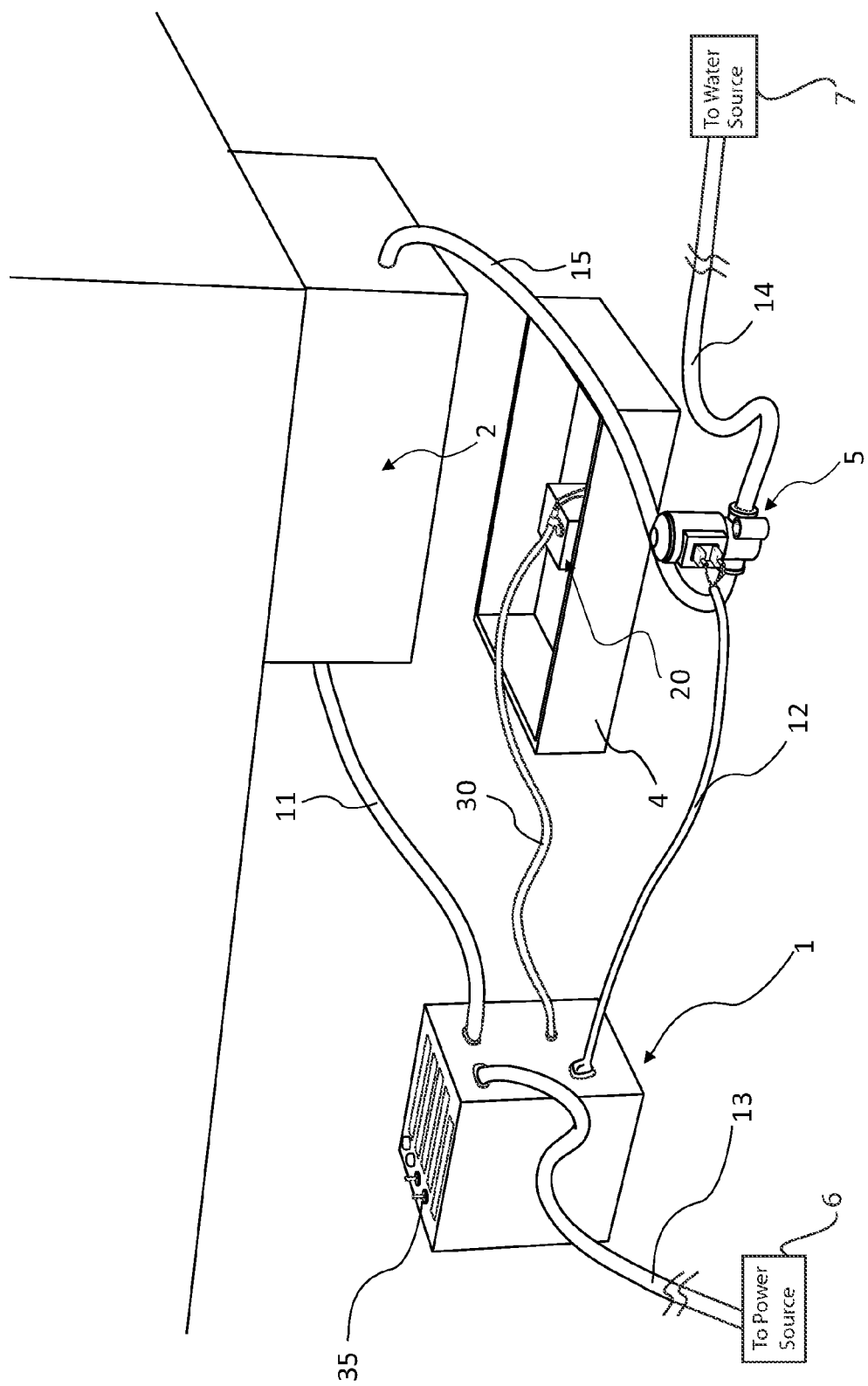
FIG. 3 is a diagram of all the components connected by the connection system.

In reference to FIG. 1 and FIG. 3, a leak detection system comprises of seven separate main components. These include an electronic control unit 1, a humidifier 2, a sensor 20, a water collection pan 4, an auxiliary solenoid valve 5, a power source 6 and a water source 7. Within the electronic control unit 1 is an electronic control unit circuit 40. The electronic control unit circuit 40 breaks down into two sub-circuits. These sub-circuits are a main circuit 50 and a detection circuit 70. The seven main components will be in connection by means of the connection system 10. The connection system 10 comprises of a humidifier power cord 11, a solenoid power cord 12, an electronic control unit power cord 13, a water source tube 14 and a solenoid tube 15. To set up the leak detection system, the water collection pan 4 is placed under the humidifier 2. In the center of the water collection pan 4 will be placed the sensor 20. The sensor 20 is then connected to the electronic control unit 1 using a sensor cable 30. The humidifier 2 will be powered by the electronic control unit 1 by means of the humidifier power cord 11 connecting the two units together. The auxiliary solenoid valve 5 is then connected to the electronic control unit 1 using the solenoid power cord 12. To be able to provide power to both the humidifier 2 and the auxiliary solenoid valve 5, the electronic control unit 1 is connected to the power source 6 by means of the electronic control unit power cord 13. The power source 6 may be a regular household power socket. To supply water to the humidifier 2 from the water source 7, a connection is first made between the water source 7 and auxiliary solenoid valve 5 by means of the water source tube 14. The water source 7 may be anything that is able to supply a steady stream of water. The solenoid valve 5 then allows water through to the humidifier 2 by means of the connection between the two units with a solenoid tube 15. When the sensor 20 detects that there is water collecting inside the water collection pan 4, the sensor 20 will send a signal back to the electronic control unit 1 notifying of leakage. Once the electronic control unit 1 receives a signal from the sensor 20 it will turn off power to the humidifier 2, disabling the humidifier 2 from allowing further leakage. The signal that the electronic control unit 1 receives from the sensor 20 will also provide power to the auxiliary solenoid valve 5, which will shut off water supply from the water source 7 to the humidifier 2.

Figure 2:
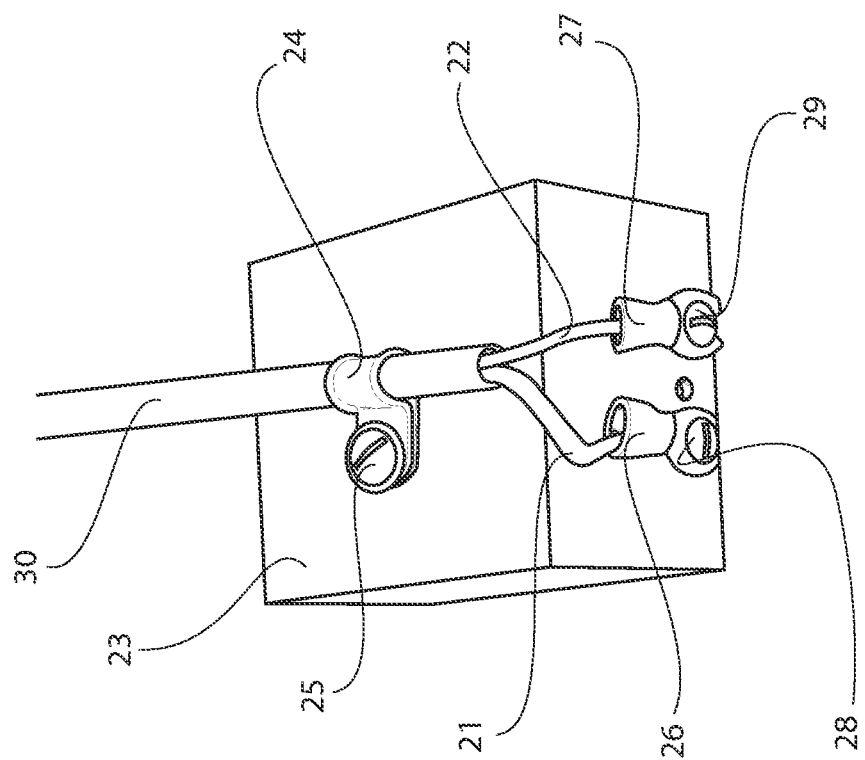
FIG. 2 is a close up diagram of the sensor used to detect water leakage.

In reference to FIG. 2, the sensor 20 comprises of ten components. The components included are the sensor cable 30, a positive wire 21, a negative wire 22, a weight block 23, a cable clamp 24, a cable clamp fastener 25, a positive wire terminal 26, a negative wire terminal 27, a positive terminal fastener 28, a and a negative terminal fastener 29. The weight block 23 is the main body of the sensor 20, which holds all the components together. The weight block 23 also stabilizes the sensor 20 in place by preventing the sensor 20 from floating about when water begins to accumulate within the water collection pan 4. The sensor cable 30 is held down onto the weight block 23 using a cable clamp 24 and attached to the weight block 23 using a cable clamp fastener 25. The sensor cable 30 runs along the top of and bend down to the side of the weight block 23. The sensor cable 30 then opens up and exposes the positive wire 21 and the negative wire 22. At the end of the positive wire 21 is attached a positive wire terminal 26 and held onto the bottom end of the weight block 23 using the positive terminal fastener 28. At the end of the negative wire 22 is attached a negative wire terminal 27 and held onto the bottom end of the weight block 23 using the negative terminal fastener 29. The positive wire terminal 26 and the negative wire terminal 27 are beside each other but not in contact. When leakage of the humidifier 2 occurs, water accumulated in the water collection pan 4 is able to conduct electricity. The electrically conducting water will then allow current to flow from the positive wire terminal 26 to the negative wire terminal 27. By allowing the current to flow from the positive wire terminal 26 to the negative wire terminal 27, the detection circuit 70 is completed. Once the electronic control unit 1 detects that the sensor 20 has completed the detection circuit 70, power to the humidifier 2 will be cut and power to the auxiliary solenoid valve 5 will be turned on.

Figure 5:
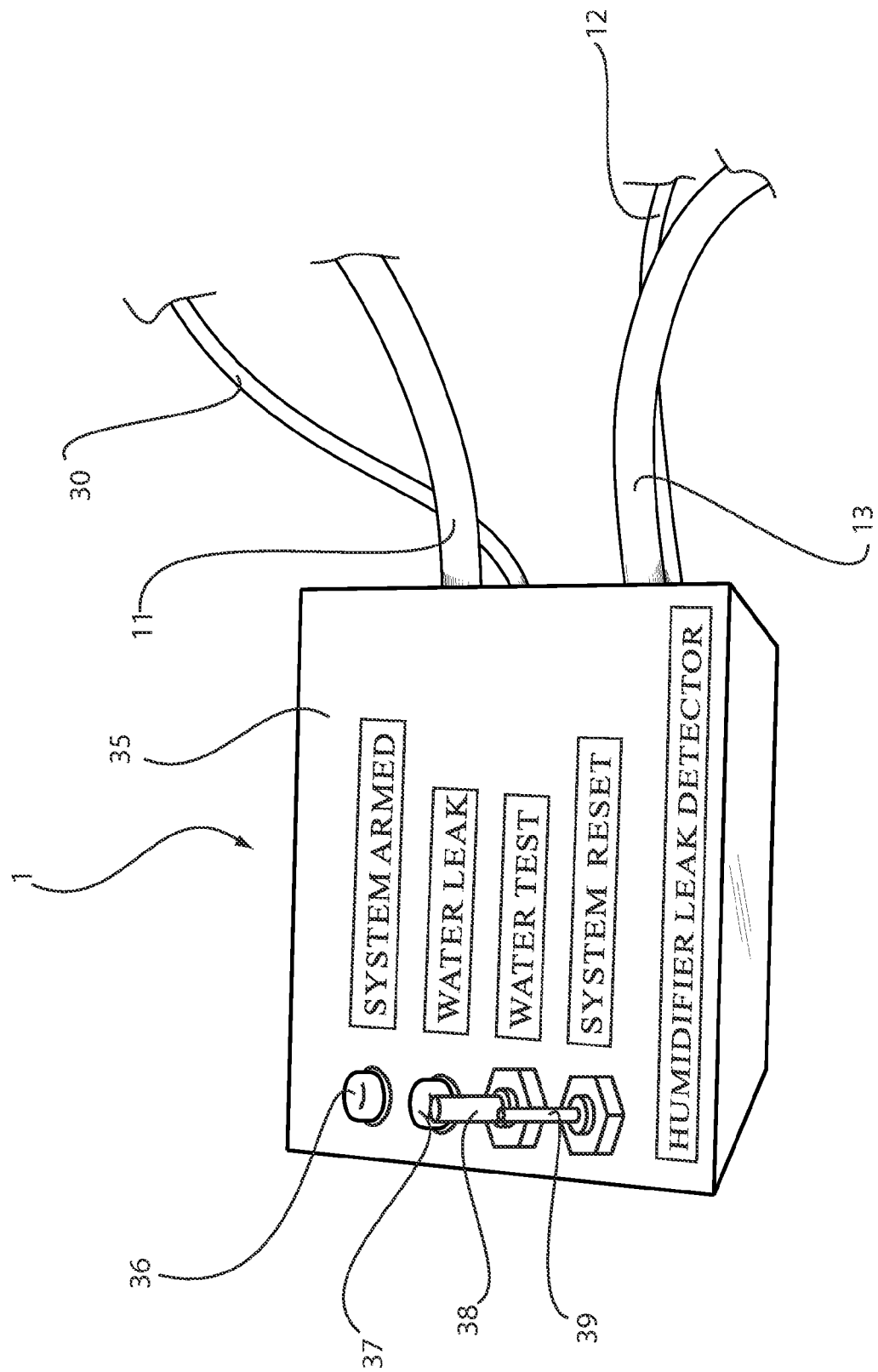
FIG. 5 is a close up diagram of the electronic control panel.
Figure 6:
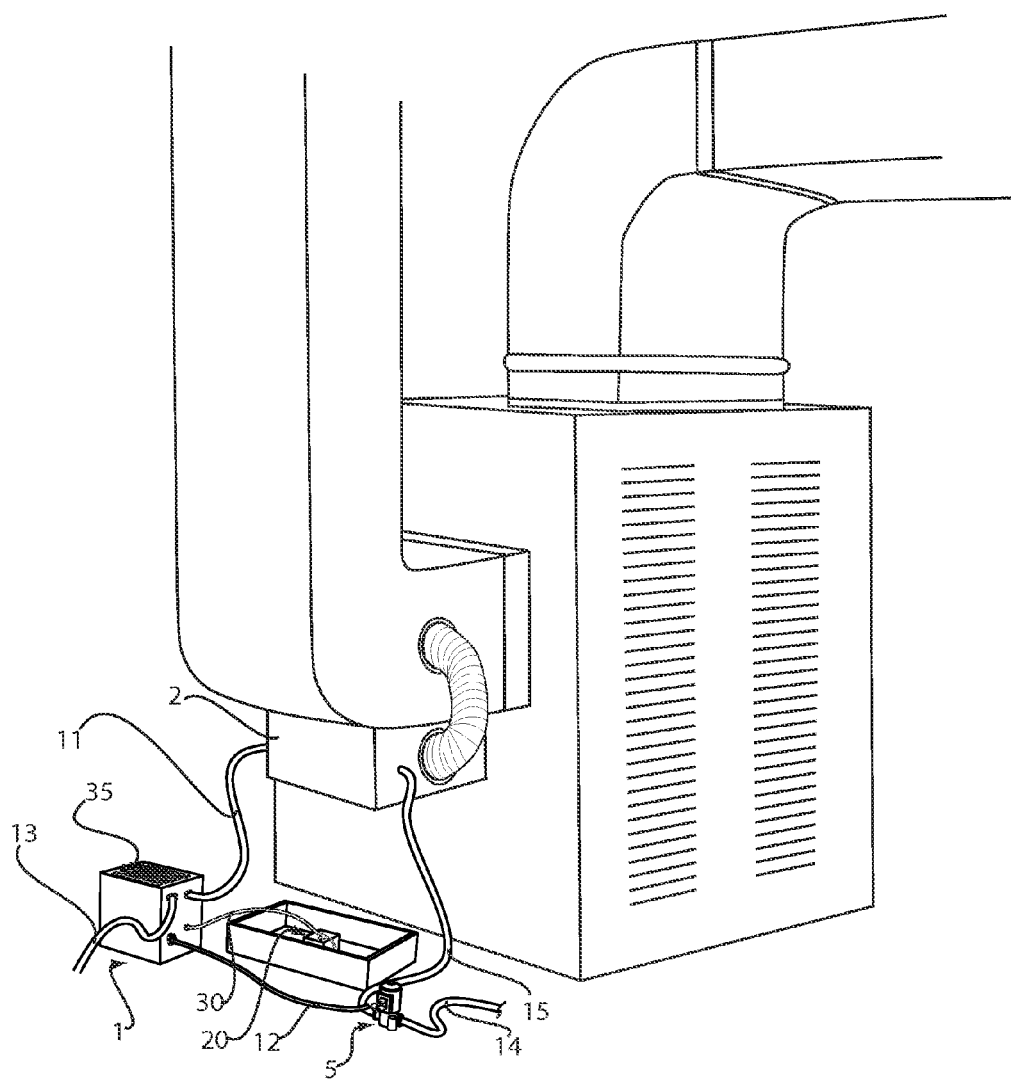
FIG. 6 is a diagram of the present invention under another humidifier/air conditioning system.

In reference to FIG. 5, the outside electronic control unit 1 is a control panel 35. The control panel 35 consists of a system function LED 36, a leakage detection LED 37, a test button 38, and a reset button 39. When the electronic control unit 1 is powered, the system function LED 36 is powered and lit as well, as a result notifying the user that the system is functioning properly. When leakage occurs in the humidifier 2, the sensor 20 will complete the detection circuit 70 alerting the electronic control unit 1. Once the electronic control unit 1 is notified that there is leakage, power to the leakage notification LED 37 is switched on, as a result the leakage notification LED 37 will be lit to notify the user of leakage. The test button 38 allows the user to test whether or not the leakage detection system is working properly. Once the test button 38 is pressed by the user, it completes the detection circuit 70. This will simulate water accumulating within the water collection pan 4 and the leakage detection system will follow through by cutting power to the humidifier 2 and switch on power to the auxiliary solenoid valve 5. The reset button 39, when pressed by the user, will activate the reset switch 77 and revert the electronic control unit 1 back to the original state. Power that was cut off to the humidifier 2 will be turned back on and power that was turned on for the auxiliary solenoid valve 5 will be cut. The humidifier 2 will continue to operate and the auxiliary solenoid valve 5 will allow water to flow through to the humidifier 2.

Figure 4:
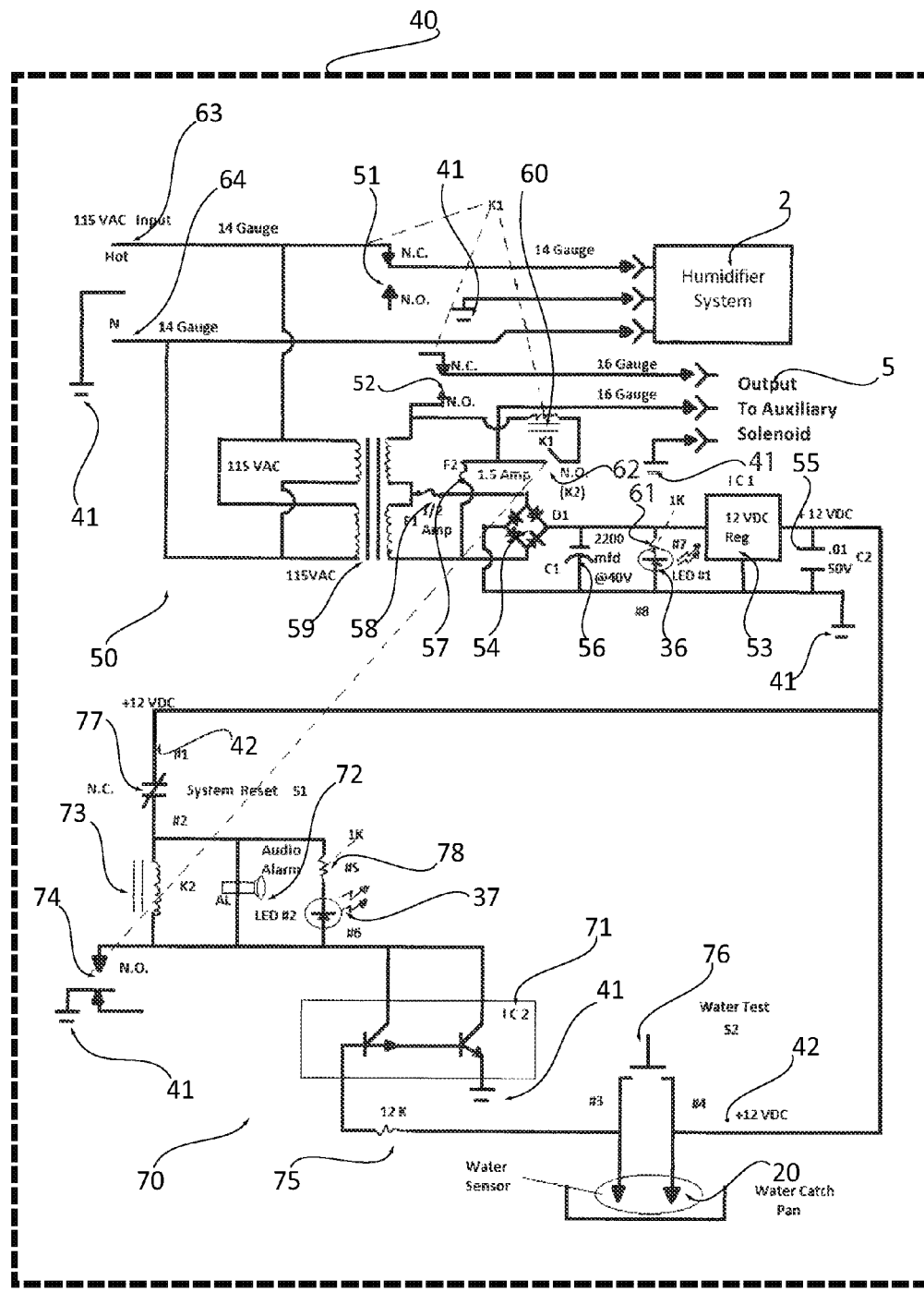
FIG. 4 is a circuit diagram of the electronic control unit circuit.

In reference to FIG. 4, the electronic control unit circuit 40 shows the main circuit 50, the detection circuit 70, a ground 41 and a 12 Volt direct current input 42. The main circuit 50 comprises of a humidifier power switch 51, a auxiliary solenoid power switch 52, a 12 voltage direct current regulator 53, a diode bridge 54, a 0.1 mfd capacitor 55, a 2200 mfd capacitor 56, a 1.5 amp fuse 57, a 0.5 amp fuse 58, a transformer 59, a switch relay coil 60, a function 1 k resistor 61, a detection activation switch 62, a 115 volt alternating current input hot 63 and a 115 volt alternating current input negative 64. The detection circuit 70 comprises of a Darlington transistor 71, an alarm speaker 72, a detection relay coil 73, a detection relay coil ground switch 74, a 12 k resistor 75, a test switch 76, a reset switch 77 and a detection 1 k resistor 78. The main circuit 50 controls the switches for the humidifier 2 and the auxiliary solenoid valve 5. The detection circuit 70 controls the activation of the entire system. The sensor 20 activates the detection circuit 70 by completing the circuit with the 12 volt direct current input 42. The test switch 76 is activated by the test button 38. Once the detection circuit 70, a current will pass through the 12K resistor 75 onto the Darlington transistor 71. The Darlington transistor 71 will amplify the current and activate the leakage detection LED 37, alarm speaker 72, and the detection relay coil 73. The leakage detection LED 37 is connected in series with a detection 1 k resistor 78 to limit the current for preventing overload. The detection relay coil 73 will close the detection relay coil ground switch 74, which connects to a ground 41 to allow the detection relay coil 73 to stabilize and remain energized without failing. The detection relay coil 73 also closes the detection activation switch 62 on the main circuit 50. The closing of the detection activation switch 62 notifies the main circuit 50 that a leakage is present. The detection activation switch 62 activates the transformer 59 and in turn the switch relay coil 60. The activated switch relay coil 60 then opens the normally closed humidifier power switch 51 and closes the normally open auxiliary solenoid power switch 52. The auxiliary solenoid valve 5 is protected by the 1.5 amp fuse 57 in case of any power spikes. The solenoid valve 5 is powered by the 24 Volt alternating current originating from the transformer 59. The diode bridge 54 is connected with the 12 Voltage Direct Current Regulator 53, as well as connected in parallel to the 2200 mfd capacitor 56, the system function LED 36 with function 1K resistor 61, and the 0.1 mfd capacitor 55. The 0.1 mfd capacitor 55 and 2200 mfd capacitor 56 are meant to act as dampers to protect the 12 Volt Direct Current Regulator 53. The system function LED 36 is normally activated when connected to a 12 volt direct current input 42. For additional protection, the 0.5 amp fuse 58 prevents power spikes to damage the 12 Volt Direct Current Regulator 53 as well. To reset the activated system, there is a reset switch 77 on the detection circuit 70. The reset switch 77 is connected to the reset button 39 on the control panel 35.

For a humidifier 2 that already contains an automatic valve for water supply. The configuration of the leakage detection system will remain the same, except the auxiliary solenoid power cord 12 will not be used. By doing so, water will be continuously flowing through the solenoid valve 5 to the humidifier 2. The leakage detection system will function in the same manner, by cutting power to the humidifier 2 when leakage is detected.

Although the invention has been explained in relation to its preferred embodiment, it is to be understood that many other possible modifications and variations can be made without departing from the spirit and scope of the invention as hereinafter claimed

What is claimed is:
1. A leakage detection system comprises,
a electronic control unit;
a humidifier;
a sensor;
a water collection pan;
a auxiliary solenoid valve;
a power source;
a water source;
the electronic control unit comprises of a control panel and a electronic control unit circuit;
the control panel comprises of a system function LED, a leakage detection LED, a test button, and a reset button;
the electronic control unit circuit comprises of a main circuit, a detection circuit, a ground, and a 12 volt direct current input;
the main circuit comprises of a humidifier power switch, a auxiliary solenoid power switch, a 12 voltage direct current regulator, a diode bridge, a 0.1 mfd capacitor, a 2200 mfd capacitor, a 1.5 amp fuse, a 0.5 amp fuse, a transformer, a switch relay coil, a function 1 k resistor, a detection activation switch, a 115 volt alternating current input hot, and a 115 volt alternating current input negative;
the electronic control unit, humidifier, sensor, and auxiliary solenoid valve being connected by a connection system; and
the connection system comprises of a humidifier power cord, a solenoid power cord, a electronic control unit power cord, a water source tube, and a solenoid tube.
2. The leakage detection system as claimed in claim 1 comprises,
the humidifier being connected to the humidifier power switch, the 115 volt alternating current input negative and the ground;
the humidifier power switch being connected to the 115 volt alternating current input hot;
the auxiliary solenoid valve being connected in series to the auxiliary solenoid power switch, and the 1.5 amp fuse;
the switch relay coil being connected in series to the deactivation switch;
the auxiliary solenoid valve, the auxiliary solenoid power switch and the 1.5 amp fuse are being connected in parallel to the switch relay and detection activation switch and being in parallel to the transformer;
the transformer being connected in series to the 115 volt alternating current input hot and the 115 volt alternating current input negative;

the diode bridge being connected in series to the 0.5 amp fuse;

the diode bridge and the 0.5 amp fuse being connected in parallel to the transformer;

the system function LED being connected in series to the 1 k resistor;

the 2200 mfd capacitor being connected in parallel to the 0.1 mfd capacitor and being in parallel to the system function LED in series with the 1 k resistor;

the 12 volt direct current regulator being connected to the 2200 mfd capacitor, the 1 k resistor, the 0.1 mfd capacitor, the ground, and the 12 volt direct current input; and the 12 volt direct current input being connected with the 12 volt direct current input, 1 k resistor, and the 0.1 mfd capacitor.

3. The leakage detection system as claimed in claim 1 comprises, the humidifier being connected to the electronic control unit by the humidifier power cord;

the auxiliary solenoid valve being connected to the electronic control unit by the solenoid power cord;

the electronic control unit being connected to the power source by the electronic control unit power cord;

the auxiliary solenoid valve being connected to the water source by the water source tube; and the solenoid being connected to the humidifier by the solenoid tube.

4. The leakage detection system as claimed in claim 3 comprises, the sensor comprises of a sensor cable, a weight block, a cable clamp, a cable clamp fastener, a positive wire terminal, a negative wire terminal, a positive terminal fastener, and a negative terminal fastener;

the sensor being connected to the electronic control unit by the sensor cable;

the sensor cable comprises of the positive wire and the negative wire;

the sensor cable being secured onto the sensor by the cable clamp;

the cable clamp being secured onto the weight block by the cable clamp fastener;

the positive wire being connected to the positive wire terminal;

the negative wire being connected to the negative wire terminal;

the positive wire terminal being secured onto the weight block by the positive terminal fastener; and the negative wire terminal being secured onto the weight block by the negative terminal fastener.

5. The leakage detection system as claimed in claim 1 comprises,

The detection circuit comprises of a Darlington transistor, an alarm speaker, a detection relay coil, a detection circuit ground switch, a 12 k resistor, a detection 1 k resistor, a test switch, and a reset switch.

6. The leakage detection system as claimed in claim 5 comprises, the sensor and test switch being connected in series with the 12 volt direct current input, the 12 k resistor, the Darlington transistor and the ground;

the Darlington transistor being connected to the leakage detection LED, the alarm speaker, the detection relay coil, and the detection circuit ground switch;

the detection circuit ground switch being connected to the ground;

the leakage detection LED being connected in series with the 1 k resistor;

the leakage detection LED and 1 k resistor being connected in parallel with the alarm speaker and the detection relay coil; and the reset switch being connected the 12 volt direct current input, the detection relay coil, the alarm speaker and the 1 k resistor.

7. A leakage detection system comprises, a electronic control unit;

a humidifier;

a sensor;

a water collection pan;

a auxiliary solenoid valve;

a power source;

a water source;

the electronic control unit comprises of a control panel and a electronic control unit circuit;

the control panel comprises of a system function LED, a leakage detection LED, a test button, and a reset button;

the electronic control unit, humidifier, sensor, and auxiliary solenoid valve being connected by a connection system;

the connection system comprises of a humidifier power cord, a solenoid power cord, a electronic control unit power cord, a water source tube, and a solenoid tube;

the auxiliary solenoid valve being connected to the water source by the water source tube;

the solenoid being connected to the humidifier by the solenoid tube;

the humidifier being connected to the electronic control unit by the humidifier power cord;

the auxiliary solenoid valve being connected to the electronic control unit by the solenoid power cord;

the electronic control unit being connected to the power source by the electronic control unit power cord;

the sensor comprises of a sensor cable, a weight block, a cable clamp, a cable clamp fastener, a positive wire terminal, a negative wire terminal, a positive terminal fastener, and a negative terminal fastener;

the sensor being connected to the electronic control unit by the sensor cable;

the sensor cable comprises of the positive wire and the negative wire;

the sensor cable being secured onto the sensor by the cable clamp;

the cable clamp being secured onto the weight block by the cable clamp fastener;

the positive wire being connected to the positive wire terminal;

the negative wire being connected to the negative wire terminal;

the positive wire terminal being secured onto the weight block by the positive terminal fastener; and the negative wire terminal being secured onto the weight block by the negative terminal fastener.

8. The leakage detection system as claimed in claim 7 comprises, the electronic control unit circuit comprises of a main circuit, a detection circuit, a ground, and a 12 volt direct current input.

9. The leakage detection system as claimed in claim 8 comprises, the main circuit comprises of a humidifier power switch, a auxiliary solenoid power switch, a 12 voltage direct current regulator, a diode bridge, a 0.1 mfd capacitor, a 2200 mfd capacitor, a 1.5 amp fuse, a 0.5 amp fuse, a transformer, a switch relay coil, a function 1 k resistor, a detection activation switch, a 115 volt alternating current input hot, and a 115 volt alternating current input negative;

the humidifier being connected to the humidifier power switch, the 115 volt alternating current input negative and the ground;

the humidifier power switch being connected to the 115 volt alternating current input hot;

the auxiliary solenoid valve being connected in series to the auxiliary solenoid power switch, and the 1.5 amp fuse;

the switch relay coil being connected in series to the deactivation switch;

the auxiliary solenoid valve, the auxiliary solenoid power switch and the 1.5 amp fuse are being connected in parallel to the switch relay and detection activation switch and being in parallel to the transformer;

the transformer being connected in series to the 115 volt alternating current input hot and the 115 volt alternating current input negative;

the diode bridge being connected in series to the 0.5 amp fuse;

the diode bridge and the 0.5 amp fuse being connected in parallel to the transformer;

the system function LED being connected in series to the 1 k resistor;

the 2200 mfd capacitor being connected in parallel to the 0.1 mfd capacitor and being in parallel to the system function LED in series with the 1 k resistor;

the 12 volt direct current regulator being connected to the 2200 mfd capacitor, the 1 k resistor, the 0.1 mfd capacitor, the ground, and the 12 volt direct current input; and the 12 volt direct current input being connected with the 12 volt direct current input, 1 k resistor, and the 0.1 mfd capacitor.

10. The leakage detection system as claimed in claim 8 comprises, the detection circuit comprises of a Darlington transistor, an alarm speaker, a detection relay coil, a detection circuit ground switch, a 12 k resistor, a detection 1 k resistor, a test switch, and a reset switch;

the sensor being connected in parallel with the test switch;

the sensor and test switch being connected in series with the 12 volt direct current input, the 12 k resistor, the Darlington transistor and the ground;

the Darlington transistor being connected to the leakage detection LED, the alarm speaker, the detection relay coil, and the detection circuit ground switch;

the detection circuit ground switch being connected to the ground;

the leakage detection LED being connected in series with the 1 k resistor;

the leakage detection LED and 1 k resistor being connected in parallel with the alarm speaker and the detection relay coil; and the reset switch being connected the 12 volt direct current input, the detection relay coil, the alarm speaker and the 1 k resistor.

11. A leakage detection system comprises,
a electronic control unit;
a humidifier;
a sensor;
a water collection pan;
a auxiliary solenoid valve;
a power source;
a water source;
the electronic control unit comprises of a control panel and a electronic control unit circuit;

the control panel comprises of a system function LED, a leakage detection LED, a test button, and a reset button;

the electronic control unit circuit comprises of a main circuit, a detection circuit, a ground, and a 12 volt direct current input;

the electronic control unit, humidifier, sensor, and auxiliary solenoid valve being connected by a connection system;

the connection system comprises of a humidifier power cord, a solenoid power cord, a electronic control unit power cord, a water source tube, and a solenoid tube;

the humidifier being connected to the electronic control unit by the humidifier power cord;

the auxiliary solenoid valve being connected to the electronic control unit by the solenoid power cord;

the electronic control unit being connected to the power source by the electronic control unit power cord;

the auxiliary solenoid valve being connected to the water source by the water source tube;

the solenoid being connected to the humidifier by the solenoid tube;

the sensor comprises of a sensor cable, a weight block, a cable clamp, a cable clamp fastener, a positive wire terminal, a negative wire terminal, a positive terminal fastener, and a negative terminal fastener;

the sensor being connected to the electronic control unit by the sensor cable;

the sensor cable comprises of the positive wire and the negative wire;

the sensor cable being secured onto the sensor by the cable clamp;

the cable clamp being secured onto the weight block by the cable clamp fastener;

the positive wire being connected to the positive wire terminal;

the negative wire being connected to the negative wire terminal;

the positive wire terminal being secured onto the weight block by the positive terminal fastener; and the negative wire terminal being secured onto the weight block by the negative terminal fastener.

12. The leakage detection system as claimed in claim 11 comprises, the main circuit comprises of a humidifier power switch, a auxiliary solenoid power switch, a 12 voltage direct current regulator, a diode bridge, a 0.1 mfd capacitor, a 2200 mfd capacitor, a 1.5 amp fuse, a 0.5 amp fuse, a transformer, a switch relay coil, a function 1 k resistor, a detection activation switch, a 115 volt alternating current input hot, and a 115 volt alternating current input negative;

the humidifier being connected to the humidifier power switch, the 115 volt alternating current input negative and the ground;

the humidifier power switch being connected to the 115 volt alternating current input hot;

the auxiliary solenoid valve being connected in series to the auxiliary solenoid power switch, and the 1.5 amp fuse;

the switch relay coil being connected in series to the deactivation switch;

the auxiliary solenoid valve, the auxiliary solenoid power switch and the 1.5 amp fuse are being connected in parallel to the switch relay and detection activation switch and being in parallel to the transformer;

the transformer being connected in series to the 115 volt alternating current input hot and the 115 volt alternating current input negative;

the diode bridge being connected in series to the 0.5 amp fuse;

the diode bridge and the 0.5 amp fuse being connected in parallel to the transformer;

the system function LED being connected in series to the 1 k resistor;

the 2200 mfd capacitor being connected in parallel to the 0.1 mfd capacitor and being in parallel to the system function LED in series with the 1 k resistor;

the 12 volt direct current regulator being connected to the 2200 mfd capacitor, the 1 k resistor, the 0.1 mfd capacitor, the ground, and the 12 volt direct current input; and the 12 volt direct current input being connected with the 12 volt direct current input, 1 k resistor, and the 0.1 mfd capacitor.

13. The leakage detection system as claimed in claim 11 comprises, the detection circuit comprises of a Darlington transistor, an alarm speaker, a detection relay coil, a detection circuit ground switch, a 12 k resistor, a detection 1 k resistor, a test switch, and a reset switch;

the sensor being connected in parallel with the test switch;

the sensor and test switch being connected in series with the 12 volt direct current input, the 12 k resistor, the Darlington transistor and the ground;

the Darlington transistor being connected to the leakage detection LED, the alarm speaker, the detection relay coil, and the detection circuit ground switch;

the detection circuit ground switch being connected to the ground;

the leakage detection LED being connected in series with the 1 k resistor;

the leakage detection LED and 1 k resistor being connected in parallel with the alarm speaker and the detection relay coil; and the reset switch being connected the 12 volt direct current input, the detection relay coil, the alarm speaker and the 1 k resistor.

\* \* \* \* \*